US006141942A

United States Patent [19]

Frederick et al.

[11] Patent Number: 6,141,942

[45] Date of Patent: *Nov. 7, 2000

[54] APPARATUS AND METHOD FOR LOADING MEDICAL ITEMS IN A DISPENSER MODULE

[75] Inventors: David T. Frederick, North Huntingdon; Kevin H. Newton, Gibsonia, both of Pa.

[73] Assignee: Diebold, Incorporated, North Canton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,239

[22] Filed: Nov. 28, 1997

[51] Int. Cl.[7] .......... B65G 59/00

[52] U.S. Cl. .......... 53/443; 53/154; 53/164; 53/168; 53/237

[58] Field of Search .......... 53/167, 168, 154, 53/155, 237, 238, 443, 445; 221/197, 198, 287, 1, 2, 277; 206/438, 538, 363

[56] References Cited

U.S. PATENT DOCUMENTS

| | | | |
|---|---|---|---|
| 3,486,658 | 12/1969 | Cheslak | 221/197 |
| 3,871,156 | 3/1975 | Koenig | 53/168 |
| 3,920,150 | 11/1975 | Greb | 221/197 |
| 4,043,483 | 8/1977 | Gore | 221/198 |
| 4,600,119 | 7/1986 | Olson | 221/197 |
| 4,757,915 | 7/1988 | Albright | 221/75 |
| 5,163,581 | 11/1992 | Lombardi | 221/256 |
| 5,190,185 | 3/1993 | Blechl | 221/1 |
| 5,197,632 | 3/1993 | Kaufman | 221/197 |
| 5,213,232 | 5/1993 | Kraft et al. | 221/277 |
| 5,265,760 | 11/1993 | Harris | 221/197 |
| 5,377,864 | 1/1995 | Blechl et al. | 221/2 |
| 5,579,951 | 12/1996 | Revelle et al. | 221/1 |
| 5,649,641 | 7/1997 | Campoli | 221/197 |
| 5,752,621 | 5/1998 | Passamante | 221/13 |
| 5,765,606 | 6/1998 | Takemasa | 53/168 |

*Primary Examiner*—Peter Vo
*Assistant Examiner*—James P Calve
*Attorney, Agent, or Firm*—Ralph E. Jocke; Daniel D. Wasil; Christopher L. Parmelee

[57] ABSTRACT

A carrier (300) for loading medical items in the helix (74) of a dispenser module (28) includes a plurality of chambers (314) formed by side walls (316) attached to a rear wall (310). Cover (322) seals the medical items within the chambers (314). A plurality of tapered projections (312) meshes with the turns of the helix (74) to align chambers (314) with the spaces between the turns of the helix. Cover (322) is then slidably released from channels (318, 320) in side walls (316) for releasing the medical items within the helix (74). An alternate embodiment includes a support member (342) with a plurality of apertures (346) spaced to correspond to the spaces of the helix (74). The plurality of holders (348) with medical items contained therein are secured to support member (342) through the apertures (346) with a strap (354). By removing strap (354), the medical items are released within the helix (74) in the selected locations. The apparatus of the present invention allows for loading either on site or at a remote location with a proper accounting and storing of the medical items.

20 Claims, 7 Drawing Sheets

APPARATUS AND METHOD FOR LOADING MEDICAL ITEMS IN A DISPENSER MODULE

TECHNICAL FIELD

This invention relates to an apparatus and a method for loading medical items in a medical dispenser module. Specifically, this invention relates to a device that allows replenishing a dispenser module with various types of medical items accurately and rapidly in a manner that controls and tracks the use of the medical items.

BACKGROUND ART

Medical items used in the treatment of patients often need to be tracked. Such medical items may include medications as well as medical devices and appliances. These medical items come in various forms and sizes, for example, in the form of pills, capsules, caplets, vials, ampules, or the like. Previously, the use of medical items was ordinarily tracked manually.

More recently, automated systems for controlling, dispensing and tracking the use of medical items have been developed. One such system is described in U.S. patent application Ser. No. 08/361,783 filed Dec. 16, 1994, now U.S. Pat. No. 5,790,409, which is owned by the Assignee of the present invention.

Because medical items are often fragile and subject to potential breakage, it is desirable to dispense several medical items together as part of a kit as disclosed in U.S. patent application Ser. No. 08/756,623 filed Nov. 26, 1996, now U.S. Pat. No. 5,848,593, which is also owned by the Assignee of the present invention. U.S. patent application Ser. Nos. 08/756,623 and 08/361,783 are both incorporated herein by reference.

A need existed for a medical item dispenser that could dispense several types of medical items including fragile items while minimizing the risk of breakage and the risk of theft of some items such as narcotics. Such a system is disclosed in co-pending U.S. patent application Ser. No. 08/879,997 filed Jun. 20, 1997, now U.S. Pat. No. 6,019,249 and which is owned by the Assignee of the present invention and hereby incorporated by reference. The medical item dispenser in that Application dispenses a wide variety of medical items reliably and accurately in response to electrical signals. That system is easy to use and provides enhanced security for preventing unauthorized access.

Still, a need exists for a device and method which allows the dispenser modules 24, 28, 30 and 128 described in U.S. patent application Ser. No. 08/879,997 to be loaded or replenished accurately and quickly. Since medical dispensers need to be periodically refilled, there is a need for a device that can readily reload dispenser modules while having the ability to take and track inventory of the items in the dispensers. There is a need for facilitating visual verification of the type and quantity of medical items which are in inventory in the dispenser module. There is also a need for such a device to have the ability to dispense several types of medical items, including fragile items, while minimizing their risk of breakage. There is further a need for enhanced security to minimize the risk that medical items may be taken while loading or replenishing the dispenser module.

DISCLOSURE OF INVENTION

It is an object of the present invention to provide an apparatus for loading medical items in a dispenser module.

It is a further object of the present invention to provide a method for loading medical items in a dispenser module.

It is a further object of the present invention to provide an apparatus for loading medical items in a dispenser module that is capable of loading items of various types and sizes.

It is a further object of the present invention to provide an apparatus for loading medical items accurately and rapidly in the helix of a dispenser module.

It is a further object of the present invention to provide an apparatus for loading medical items that provides a secure carrier for the medical items until they replenish the dispenser module.

It is a further object of the present of the invention to provide an apparatus for loading medical items in a dispenser module that minimizes the risk of damage to the medical items while in transit.

It is a further object of the present invention to provide an apparatus for loading medical items that facilitates taking inventory of the number of medical items used and required by the dispenser module.

It is a further object of the present invention to provide a device for loading medical items in a dispenser module that is constructed to also function as a container or carrier securing a specific number of medical items in a secure manner.

Further objects of the present invention will be made apparent in the following Best Modes for Carrying Out Invention and the appended claims.

The foregoing objects are accomplished in a preferred embodiment of the invention by an apparatus which loads medical items in a dispenser module. The apparatus includes a rear wall having a first and second side with the rear wall including a plurality of tapered projections selectively spaced apart on a lower edge thereof. The plurality of tapered projections are constructed and spaced to slidably mesh with a helix in the dispenser module. A plurality of side walls are attached to the first side of the rear wall at predetermined locations to define a plurality of chambers for receiving medical items. Each of the chambers corresponds to a space between turns of the helix in the dispenser module. A cover engages each of the side walls and provides means for sealing each of the chambers. The cover can be movably disengaged for releasing the medical items one-by-one into the helix of the dispenser module.

In a preferred form of the invention, the rear wall of the apparatus includes at least one hook member attached to the second side of the rear wall for clasping a guide wall of the dispenser module. Stand-off tabs positioned around the periphery of the second side of the rear wall facilitates alignment of the plurality of chambers with the turns of the helix in the dispenser module. Also, in the preferred form of the present invention, the plurality of side walls are attached at an angle corresponding to a pitch of the helix of the dispenser module. Each of the side walls has a first channel positioned in an upper portion of the side wall and a second channel positioned in the lower portion of the side wall to receive the cover in slidable engagement. The first side wall includes a conduit attached in its lower portion which when aligned with an aperture at one end of the cover provides means for securing the cover thereto and seals the medical items within the chambers.

An alternate embodiment of the present invention includes a support member with a plurality of apertures spaced apart at preset intervals. The intervals correspond to spaces between turns of the helix in the dispenser module.

A plurality of holders, each having a projecting portion on an upper side thereof, are constructed to receive and contain a medical item. The projecting portion is received by the aperture in the support member. The projecting portions of the holders have openings therethrough that align as they are positioned in the support member. Securing means for example a strap or the like locks the plurality of holders within the support member to provide a secure carrier for the medical items to replenish the dispenser module. Both embodiments of the present invention are suited for use with a bar code reader for taking inventory and for insuring proper verification that the correct medical items are being replenished in the proper dispenser module.

BEST MODES FOR CARRYING OUT INVENTION

Figure 1:
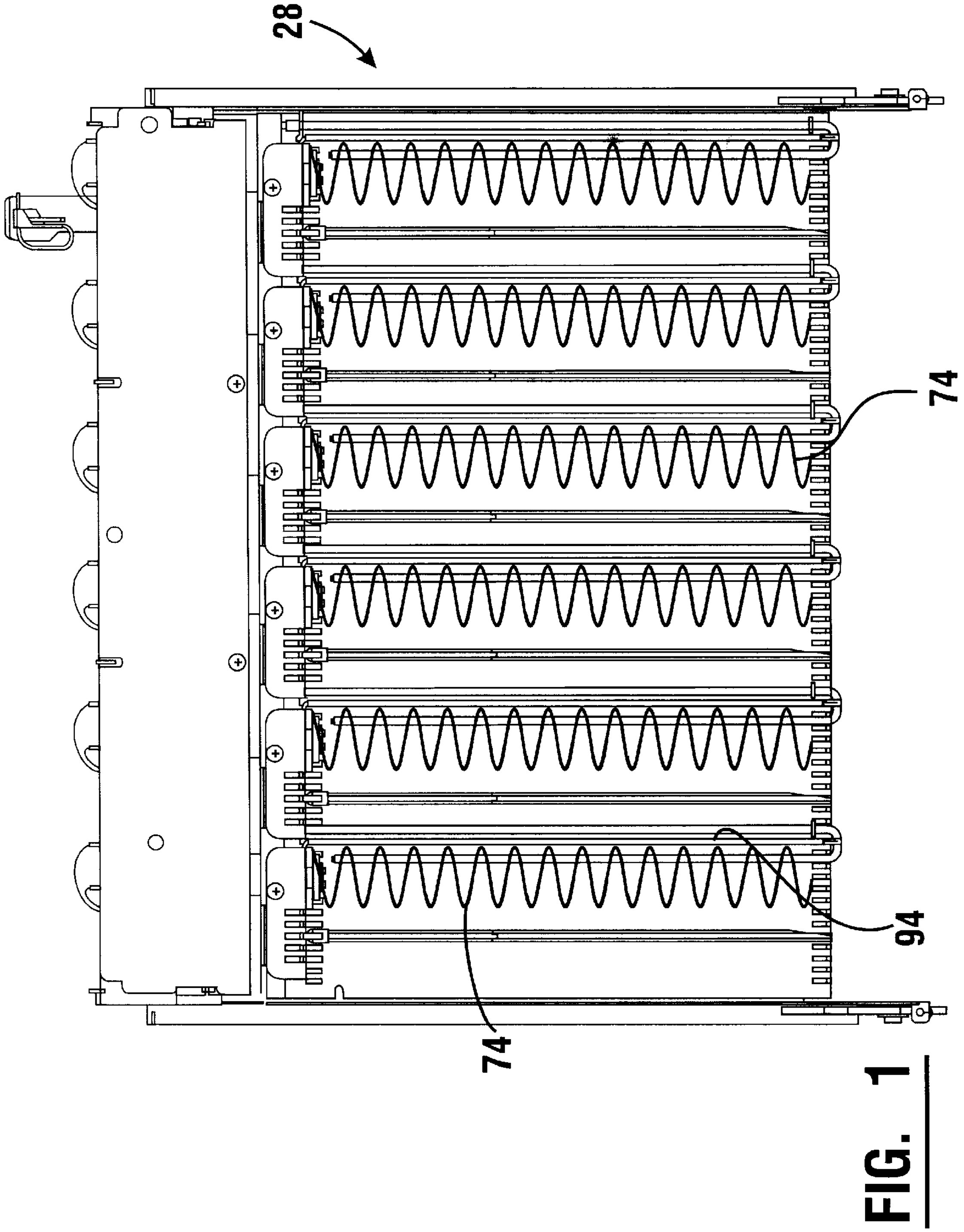
FIG. 1 is a top plan view of one type of dispenser module that may be loaded with the apparatus according to the present invention.

Referring now to the drawings where like numerals designate like or similar features throughout the several views and in particular to FIG. 1, there is shown a dispenser module constructed to fit within a dispenser apparatus for dispensing medical items as fully disclosed and described in co-pending U.S. patent application Ser. No. 08/897,997 filed Jun. 20, 1997. Dispenser module 28 is configured for dispensing medical items such as medications of the pill or caplet type. It is understood that the present invention is suitable for any type of dispenser module having a helix therein for dispensing any type of medical item, including but not limited to medical items that are housed in cylindrical containers such as ampules, or vials which hold liquid medications, medications of a pill, capsule or caplet type, dermal patches, syringes, suction tubes, and the like. Dispenser module 28 may be configured in numerous ways to accommodate different sizes and types of medical items as described in U.S. patent application Ser. No. 08/897,997. It is understood that the apparatus and method according to the present invention likewise accommodates different sizes and types of medical items.

Dispenser module 28 includes a plurality of holders therein for holding a plurality of different types of medical items. Each holder includes a spiral member or helix 74. Each helix is selectively rotatable by a dispenser mechanism. The rotation of each helix 74 one turn causes a medical item held therein to be moved towards a dispense location. Medical items are positioned in a nested relation in each turn of the helix 74. As a result, with each rotation of the helix 74 by the rotating mechanism, one medical item is moved outwardly to disengage the free end of the helix 74 and to fall into a path which extends in the dispenser. The dispenser module 28 can be taken to a remote location for replenishment, inventory purposes, or it may be replenished and inventoried on site.

Figure 2:
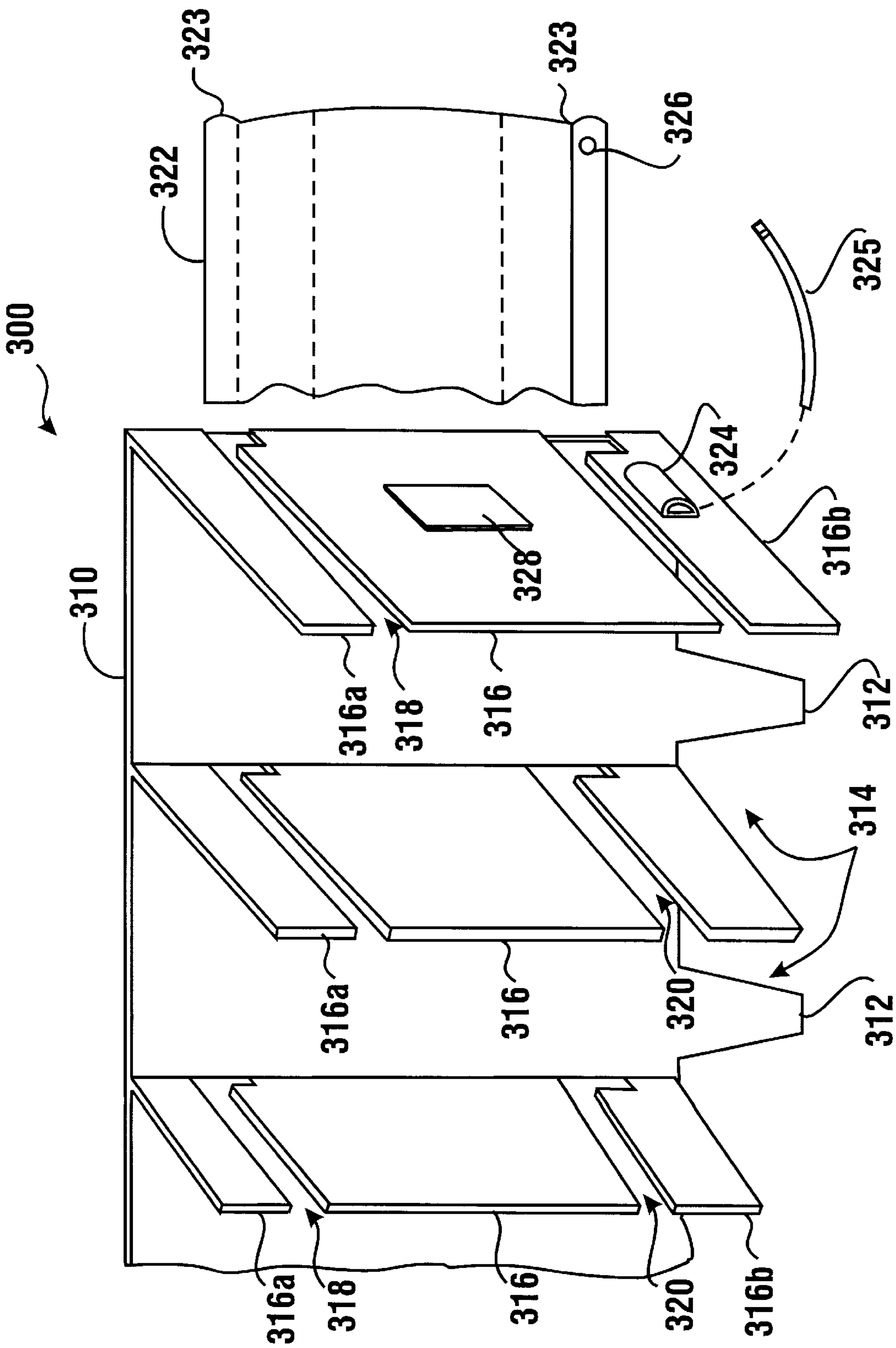
FIG. 2 is an elevated partial frontal view of the apparatus according to the present invention.
Figure 7:
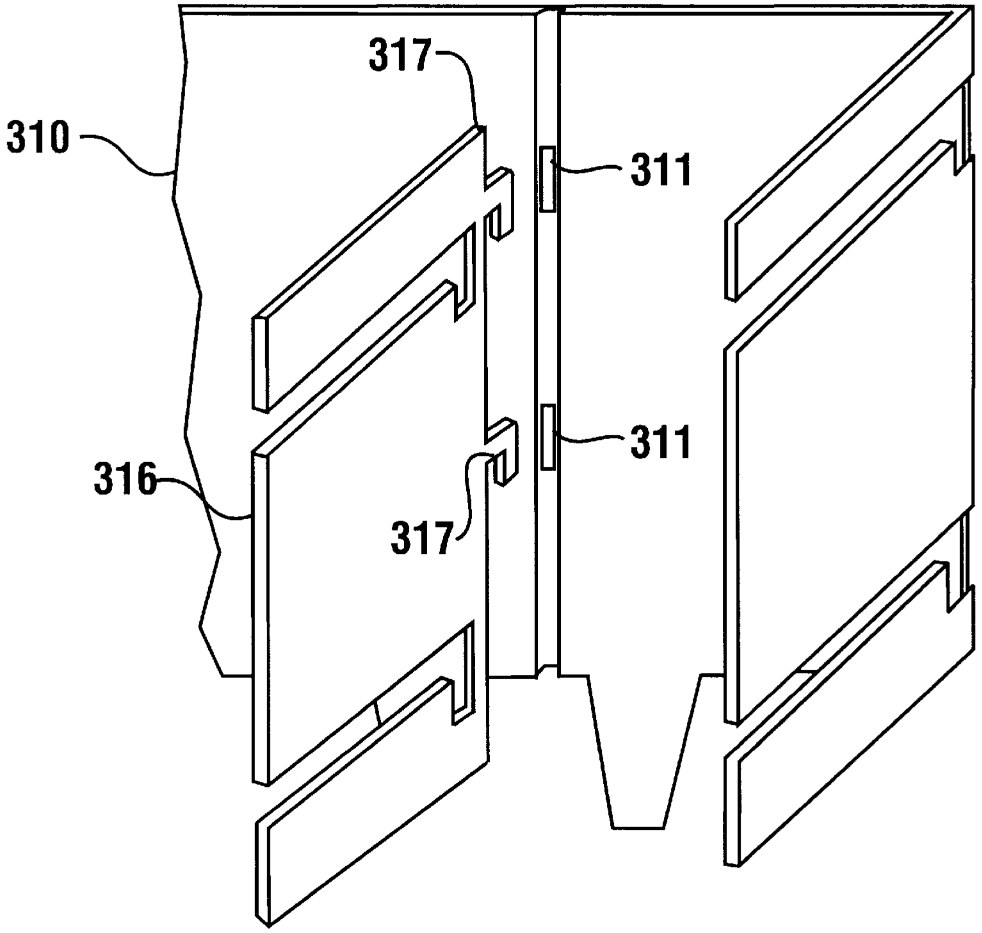
FIG. 7 is an elevated partial frontal view of an alternate form of the apparatus showing side walls that are removably attached to the rear wall.

The apparatus in accordance with the present invention generally designated 300 functions as a carrier or a container for the medical items to be loaded in such a dispenser module 28. Carrier 300 may be employed at a remote location for replenishing dispenser modules, or it may be used on site. Referring to FIG. 2, carrier 300 includes a rear wall 310 with a plurality of tapered projections 312 on its lower edge. The tapered projections 312 are selectively spaced to correspond with the turns of a helix, such as helix 74, in dispenser module 28. Tapered projections 312 slidably engage the helix in the dispenser module to align chambers 314 with the spaces between the turns of the helix. Chambers 314 are formed by a plurality of side walls 316 attached to a first side of the rear wall 310. While FIG. 2 depicts two chambers 314, it is understood that carrier 300 can include any number of chambers 314 as is desired by attaching the requisite number of side walls 316 to the rear wall 310. Even though FIG. 2 shows the side walls 316 rigidly attached to rear wall 310, it is envisionable that side walls 316 could be removably attached to rear wall 310. FIG. 7 shows side walls 316 that are removably attached to rear wall 310 through apertures 311 in rear wall 310 with hook portions 317 on side walls 316 to allow for various sized medical items.

Side walls 316 are attached at predetermined locations for defining chambers 314 to correspond with the size and type of medical item intending to be replenished in the dispenser module. A first channel 318 in the upper portion **316*a* and second channel 320 in a lower portion 316*b* of the side wall 316 provide a track for cover 322 to slidably close each chamber 314 for carrier 300. Preferably, channels 318, 320 are L shaped with the leg of the L pointing in a downward direction for the cover 322** to be slidably engaged therein.

A conduit 324 is located on an outermost side of the lower portion **316*b* of the first side wall 316. When conduit 324 is aligned with an aperture 326 on the cover 322, it provides means for securing the cover 322 on the carrier 300. Any suitable securing means schematically indicated 325 such as a nylon tie or strap or rod provides immediate verification that carrier 300 has not been tampered with. It further allows authorized personnel to immediately see that none of the medical items have been taken or stolen. A bar code 328 or other human or machine readable indicia optionally located on carrier 300 allows the service personnel to verify correct medical items are being replenished in the proper dispenser module prior to breaking the safety seal created by the securing means through conduit 324 and aperture 326**.

Cover 322 is preferably constructed of a clear plastic material to allow visual inspection of the medical items contained within the chambers 314. Cover 322 is substantially U shaped and is slidably received in channels 318, 320. Cover 322 preferably has edge portions 323 that are shaped to correspond with the L shaped channels 318, 320.

Figure 4:
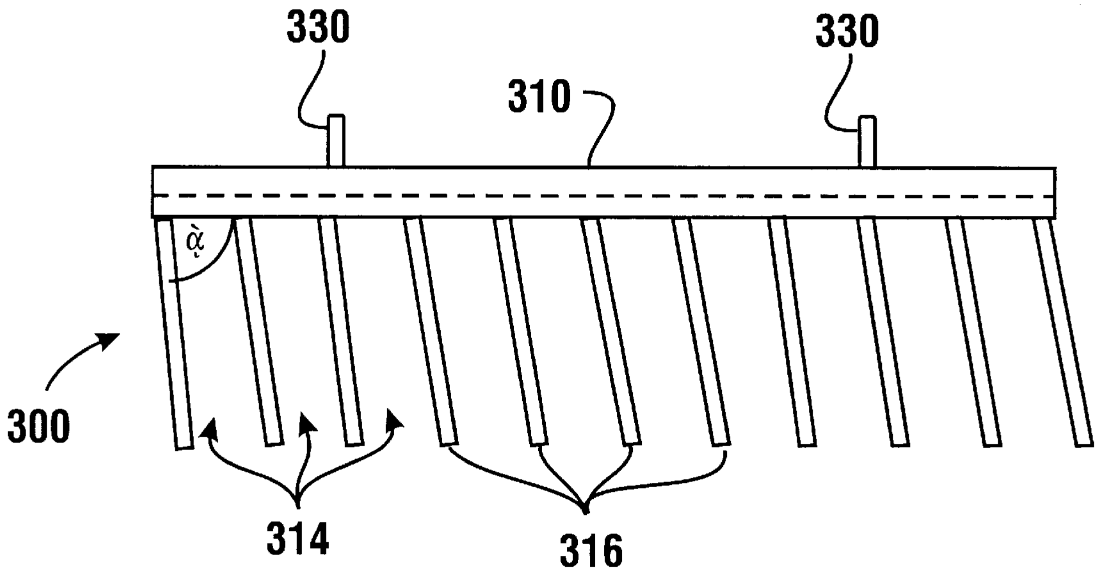
FIG. 4 is a top plan view of the apparatus according to the present invention without the cover.

Next, referring to FIG. 4, in the preferred embodiment the side walls 316 are attached at an angle alpha ($\alpha$) to the rear wall 310. The angle alpha corresponds to a pitch of the helix of the dispenser module and facilitates the alignment of chambers 314 with the spaces between the turns in the helix. FIG. 4 depicts ten chambers 314. As mentioned earlier, any number of chambers can be selected by extending the rear wall 310 and adding side walls 316. For inventory purposes, a carrier 300 with ten chambers 314 is preferred for ease of accounting. Of course, carrier 300 could contain as many chambers 314 as there are spaces in one complete helix.

Figure 3:
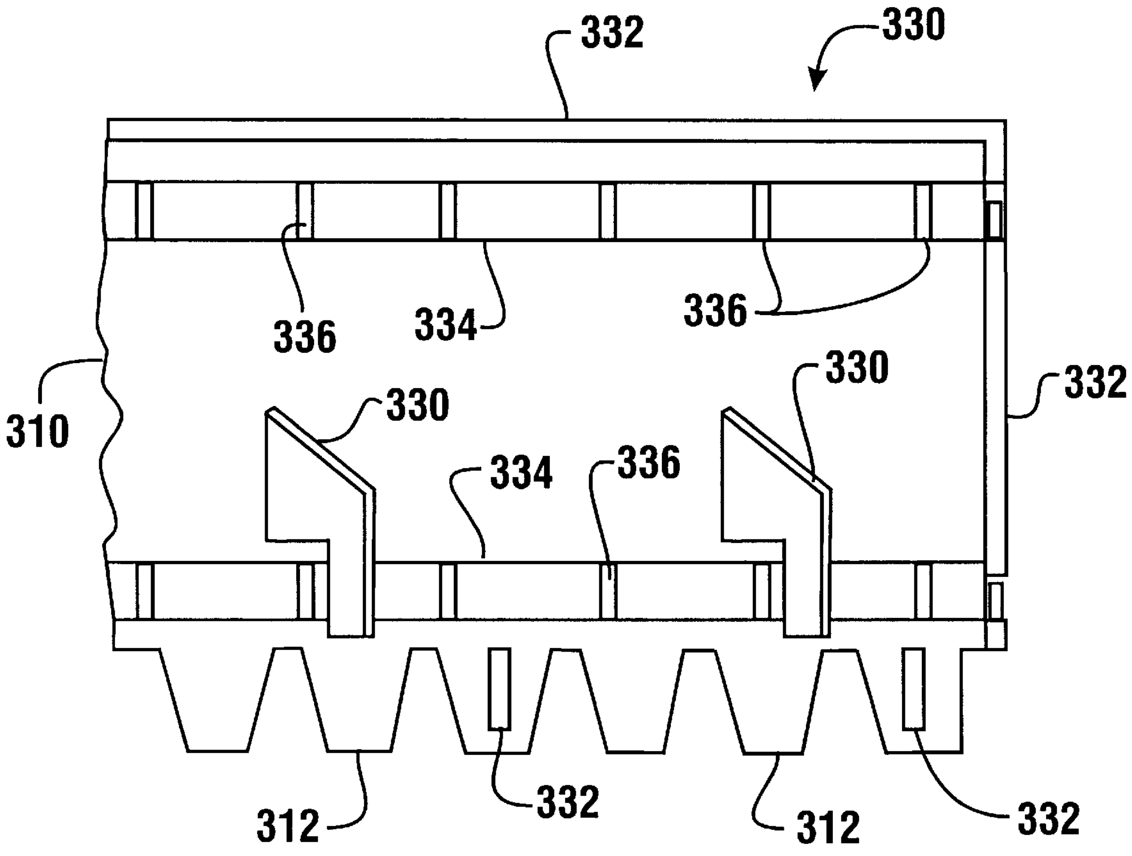
FIG. 3 is an elevated partial rear view of the apparatus according to the present invention.

As best seen in FIG. 3, the second side of rear wall 310 includes hook members 330. Hook members 330 are positioned on a guide wall 94 or even a guide 104 (shown in FIG. 1) to hold the carrier 300 in position once the tapered projections slidably engage the helix in the dispenser module. Stand-off tabs 332 situated around the periphery of the rear wall 310 and on several tapered projections 312 facilitate the alignment of the carrier 300 over the helix in the dispenser module. In one embodiment these hook members 330 and stand-off tabs 332 may be attached to the rear wall 310 at an angle corresponding to the pitch of the helix of the dispenser module.

Preferably, rear wall 310 includes grooves 334 and apertures 336 that are in alignment with and located on the same side of the rear wall 310 as the first and second channels 318, 320. Grooves 334 are slightly recessed on the first side of the rear wall 310 and the groove 334 on the upper portion of rear wall 310 bulges slightly outward on the second side of rear wall 310. Grooves 334 along with the plurality of apertures 336 facilitate the movement of the cover 322 in the channels 318, 320 in the preferred embodiment.

As cover 322 is withdrawn from channels 318, 320, medical items contained within chambers 314 are released on a one-to-one basis with the spaces in the helix and drop gently into the spaces between the turn in the helix of the dispenser module. In the preferred embodiment, the carrier 300 is made of a plastic material, but other materials including but not limited to metal, cardboard, or pressed board, would be suitable. Also, the surfaces of the side walls 316 and the front of rear wall 310 are preferably smooth to allow a medical item contained within the chambers 314 to be released into the helix.

When a medical item is fragile and breakage is a potential concern, an absorbing surface may be wrapped around the fragile medical item to be released with that medical item into the helix, or alternatively an absorbing surface may be fixedly attached to adjacent side walls to cushion the medical item during transit and during replenishment. Suitable absorbing surfaces are well known to those in the medical art and include but are not limited to foam rubber, styrofoam, paper, cushioned plastic, or the like.

Figure 6:
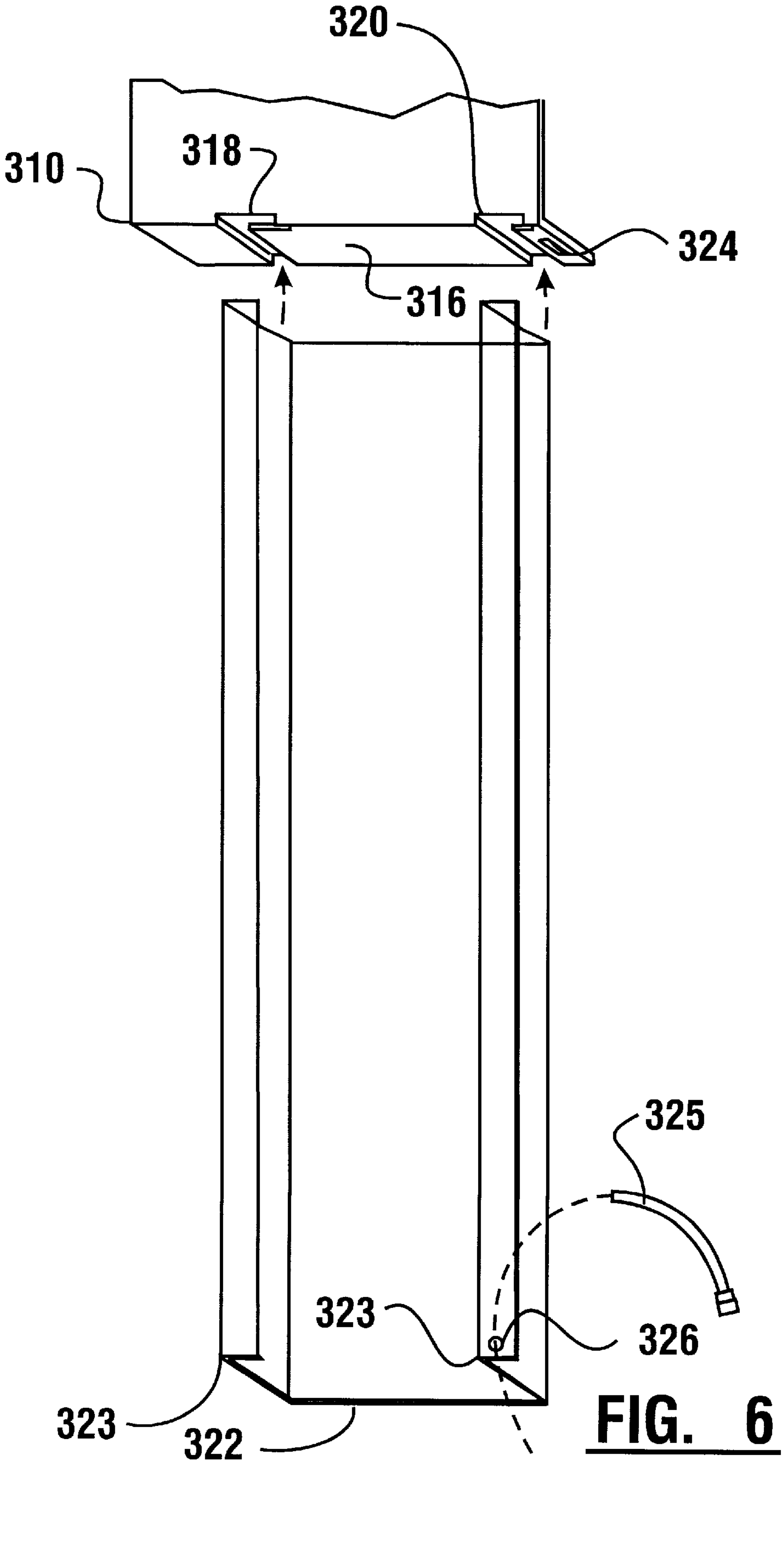
FIG. 6 is a side view of the entire cover according to an exemplary embodiment of the present invention.

In accordance with the method of the present invention, a supply of carriers 300 is available at the location where medical items are manufactured or stored. All of the chambers 314 are loaded with a selected type of medical item which may be indicated by human and/or machine readable indicia located on a label or tag on the carrier 300, or even as a selected bar code 328 placed on the carrier 300. A cover 322 is slidably engaged through channels 318, 320 for containment of the medical items within chambers 314. The aperture 326 in cover 322 is aligned with the opening in conduit 324. A nylon strap (not shown) or some other securing means is heat sealed or mechanically engaged to provide a tamper indicating container for the medical items within carrier 300. As is immediately apparent, containers 300 may be used for storage or inventory purposes once the medical items are sealed therein. FIG. 6 schematically represents the entire cover 322.

Dispenser modules may either be brought to the storage location for replenishment of medical items, or they may be replenished on site. Authorized personnel can visually inspect and verify the contents contained within a container or carrier 300 through the clear plastic cover 322. The contents for replenishment of a specific helix in a dispenser module may also be verified through the use of a label contained on the carrier 300 or with the use of a bar code reader, which is a device well known to one of ordinary skill in the art. The bar code 328 optionally is situated on carrier 300 with a corresponding bar code optionally positioned for a specific helix in the dispenser module. The bar code reader reads both bar codes and signals the authorized personnel with a warning or other signal if there is disagreement. Alternatively, entire dispenser modules may have one bar code to load that specific dispenser module with a specific type of medical item.

Authorized personnel place carrier 300 on a guide wall 94 in the dispenser module so that the plurality of tapered projections 312 slidably mesh or engage the turns of the helix 74 contained within the dispenser module 28. Hook members 330 located on the back of carrier 300 engage guide wall 94 to support the carrier 300 thereon. Stand-off tabs 332 assist in aligning carrier 300 over the turns of the helix 74. The authorized personnel then cuts or removes the sealing means that binds the cover 322 to the side walls 316 and rear wall 310. Next, cover 322 is withdrawn from channels 318, 320 with each of the medical items contained in the chambers 314 being released to fall within the space formed by the turns of the helix.

Cover 322 may contain a tab thereon (not shown) to assist in removing the cover from carrier 300. After all of the medical items are released from carrier 300, carrier 300 may be reused or discarded. As is evident from the above, the apparatus and method in accordance with the present invention provides a safe and secure means for rapidly replenishing a dispenser module with the ability to verify accuracy and correct content of the medical items in the dispenser module through the use of tags or labels or automatic means such as bar code 328 with the use of bar code readers. As mentioned earlier, side walls 316 may be removably attached to rear wall 310 to prevent flexibility in accommodating larger sized medical items. Similarly, side walls 316 can be extended out and away from rear wall 310 for accommodating longer medical items which may be required, for example, in a dispenser module like dispenser module 128 described in U.S. application Ser. No. 08/879,997.

Figure 5:
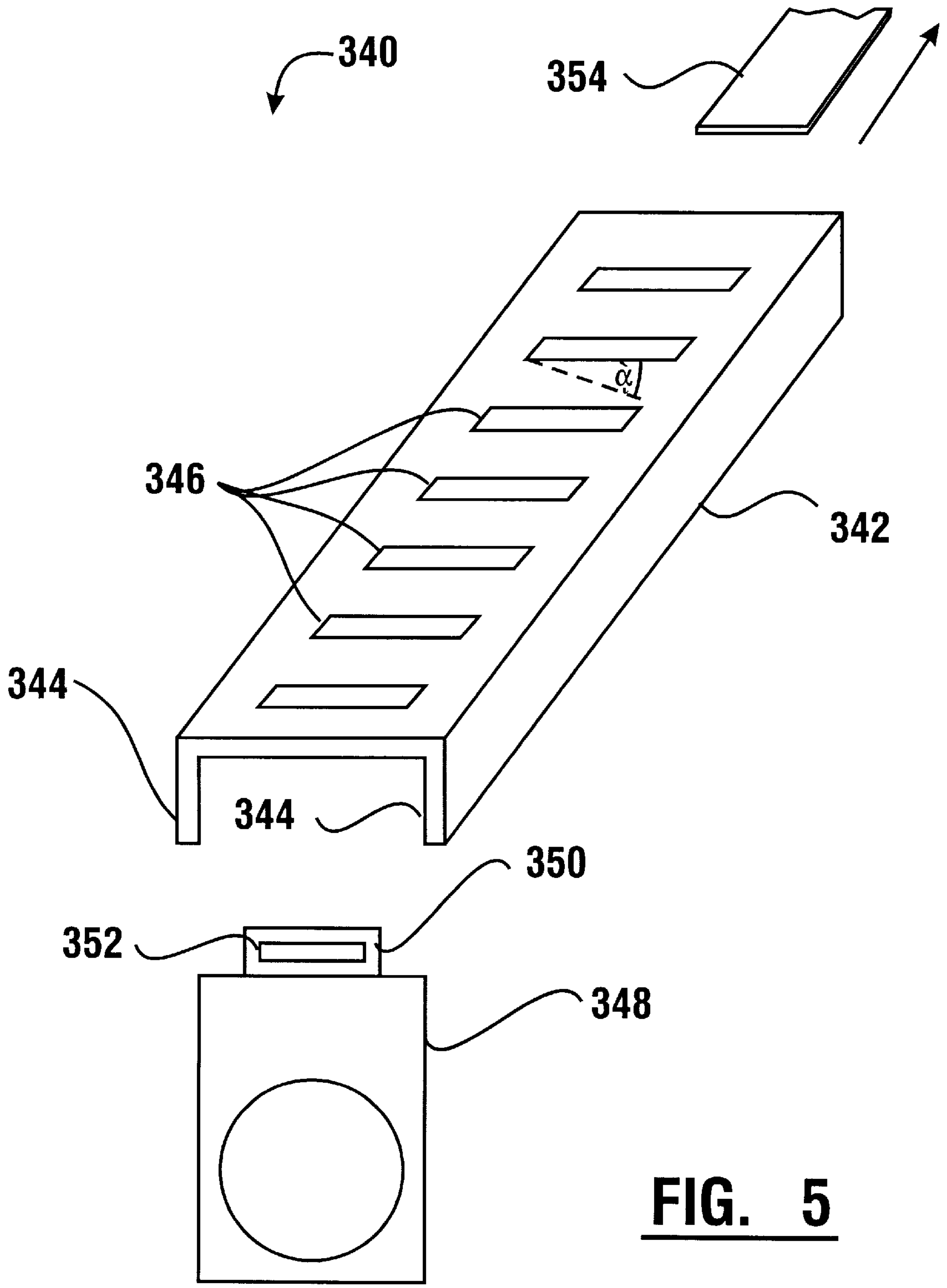
FIG. 5 is an elevated view of an alternate embodiment in accordance with the present invention.

Turning next to FIG. 5, there is shown an alternate embodiment in accordance with the apparatus and method of the present invention. In FIG. 5, carrier 340 comprises a support member 342 preferably in the shape of a channel. The legs 344 of support member 342 provide additional stability when carrier 340 holds a plurality of medical items. Support member 342 includes a plurality of apertures 346 spaced apart at preset intervals. Preferably apertures 346 are rectangular in shape and the spaced intervals correspond to spaces between turns of the helix in the dispenser module. The plurality of apertures 346 are situated on the main portion of the support member 342.

A plurality of holders 348 each have a projecting portion 350 which is constructed to fit snugly within an aperture 346. Each projecting portion 350 also includes an opening 352 therethrough. When a plurality of holders 348 are snugly received within the support member 342 through apertures 346, the openings 352 on the projecting portion 350 of the plurality of holders 348 are in axial alignment and extend sufficiently through apertures 346 so that means for securing, such as a strap 354, may be passed therethrough holding and securing the plurality of holders 348 to support member 342. Strap 354 may be a nylon strap or belt that may be heat shrunk or mechanically tightened to provide a tamper proof securing means for the holders 348 within the support member 342. While FIG. 5 depicts the securing means as a strap 354, it is understood that the securing means could include any type of securing means such as a rod, rope, pin or like structure that provides a way of sealing so that it is immediately apparent upon visual inspection whether the carrier has been tampered with.

While holders 348 are particularly suited for a card type holder for containing pills or caplets fixed thereto, it is equally envisionable that holder 348 can contain liquid medications in an ampule or vial. The method of using carrier 340 is similar to that of carrier 300 in that an authorized person would load the support member 342 with the plurality of holders 348 containing the medical item. Strap 354 would be employed to secure the plurality of holders 348 to the support member 342. A tag or label (not shown) or bar code similar to bar code 328 or other indicia, may be placed on the support member so that carrier 340 is accurately labeled and documented for storage as part of inventory, or for replenishment of dispenser modules by authorized personnel. Carrier 340 would be positioned over the helix and strap 354 would be removed to selectively place holders 348 with the medical item contained therein within the spaces created by the turns of the helix in the dispenser module. Like carrier 300, carrier 340 may have a bar code for comparison with a bar code on a helix of the dispenser module, or even the dispenser module itself. Furthermore, apertures 346 may be at an angle ($\alpha$) on support member 342 to correspond with the pitch of the helix in a manner similar to side walls 316.

Even though support member 342 and holders 348 are preferably made from plastic material, other materials would include but are not limited to metal, cardboard, paper, or any other type of pressed board. Strap 354 is preferably made from a plastic material or nylon which may be secured in a locked manner by heat shrinkage, melting, mechanically or the like. Also, while support member 342 is depicted as a channel, it is understood that support member 342 can be an elongated flat member or even an angled member with hook members similar to hook members 330 for carrier 300. Holders 348 may be reusable, or constructed for one time use.

As will be appreciated from the foregoing description, the preferred embodiment of the apparatus of the present invention provides a device that accurately and rapidly loads the helixes of a dispenser module either in a remote location or on site. The device is constructed to provide security for visual or automatic inspection to protect against tampering as well as a method for accurately documenting and accounting for medical items susceptible to theft or damage. The device of the present invention may be readily used with various sized helixes and can replenish helixes dispensing different sized medical items. Also, the device of the present invention may be employed with indicia as described in the Application to quickly alert a user to the proper count of medical items held in the helix. This greatly reduces the time necessary for purposes of accounting and taking inventory. The method of the present invention is simple to use and still provides an accurate and rapid process for replenishing or loading a dispenser module.

Thus, the apparatus and method of the present invention achieve the above stated objectives, eliminates difficulties encountered in the use of prior devices and systems such as manual loading and accounting of the helixes in the dispenser module, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means capable of performing the recited function and shall not be deemed to be limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. A method for loading medical items in a dispenser module, comprising the steps of:

providing a carrier wherein the carrier is in operative connection with a releasing mechanism operative to releasibly hold a plurality of medical items in a predetermined spaced arrangement, the predetermined spaced arrangement corresponding to spaces between turns of a helix in a dispenser module;

placing a plurality of medical items in engagement with the carrier;

positioning the carrier adjacent to the helix in the dispenser module so that the medical items are in alignment with the corresponding spaces between turns of the helix; and releasing with the releasing mechanism the plurality of medical items from engagement with the carrier, wherein the medical items move into the spaces between turn of the helix of the dispenser module.

2. A method according to claim 1, further comprising the steps of reading a first indicia on the carrier and comparing it with a second indicia on the dispenser module to verify accurate replenishment.

3. A method according to claim 1, further comprising the step of taking inventory of replenished medical items in the dispenser module.

4. A method according to claim 3, wherein the taking step includes the step of using a bar code reader.

5. A method of loading medical items into a dispenser module, comprising the steps of:

(a) placing a plurality of medical items in operatively engaged relation with a carrier, wherein the medical items are engaged in a predetermined spaced arrangement, wherein the medical items in the predetermined spaced arrangement extend along a longitudinal axis of the carrier and are separated from each other, wherein each medical item in the predetermined spaced arrangement corresponds to one of a plurality of medical item holding spaces in a dispenser module;

(b) moving the carrier into adjacent relation with the holding spaces in the dispenser module, wherein each of the medical items is in aligned relation with one of the holding spaces; and (c) releasing the medical items from operatively engaged relation with the carrier, wherein the plurality of medical items move substantially transverse to the longitudinal axis of the carrier into the plurality of medical item holding spaces.

6. The method according to claim 5 wherein step (a) includes placing a medical item in each of a plurality of chambers in supporting connection with the carrier, and closing the medical items in the chambers by moving a cover in overlying relation of the chambers, and wherein step (c) includes moving the cover relative to the carrier, wherein the cover is no longer in overlying relation of the chambers.

7. The method according to claim 5 wherein step (a) includes operatively engaging each of the plurality of medical items with a movable holding member, wherein the medical items are operatively engaged with the carrier, and wherein step (c) comprises moving the movable holding member to no longer operatively engage the medical items.

8. The method according to claim 5 wherein the carrier includes at least one projection in operative connection therewith, and wherein step (b) comprises extending the projection into one of the holding spaces.

9. The method according to claim 5 wherein the carrier includes two spaced projections in operative connection therewith, and wherein step (b) comprises extending a first projection into a first holding space and a second projection into a second holding space.

10. The method according to claim 9 wherein the dispenser module includes a helix, and wherein the holding spaces are bounded by turns of the helix, and wherein step (b) includes extending the first projection and the second projection between disposed turns of the helix.

11. The method according to claim 5 wherein the carrier has in operative connection therewith a plurality of spaced projections, and wherein the dispenser module includes a rotatable helix, and wherein the holding areas are bounded by turns of the helix, and wherein the spaced projections are spaced to be in interfitting relation between turns of the helix, and wherein step (b) includes engaging the spaced projections in interfitting relation between turns of the helix.

12. The method according to claim 5 wherein the dispenser module includes a guide wall, and wherein the carrier includes a hook shaped portion in supporting connection therewith, and wherein step (b) comprises engaging the hook shaped portion and the guide wall.

13. The method according to claim 12 wherein the carrier includes a plurality of spaced hook shaped portions in supporting connection with the carrier, and wherein step (b) comprises engaging each of the plurality of hook shaped portions with the guide wall.

14. The method according to claim 12 wherein the carrier further comprises a standoff tab in supporting connection with the carrier, and wherein step (b) comprises extending the guide wall in intermediate relation of the hook shaped portion and the standoff tab.

15. The method according to claim 5 and prior to step (b) further comprising the steps of:

securing with a securing member the plurality of medical items in operatively engaged relation with the carrier;

and prior to step (c) releasing the securing member, whereby the medical items are enabled to be released from operative engagement with the carrier.

16. The method according to claim 15, wherein the securing member is a tamper indicating securing member, and prior to the step of releasing the securing member, further comprising the step of inspecting the securing member for an indication of tampering.

17. The method according to claim 5 wherein the plurality of medical items in operative connection with the carrier are each a type medical item, and further comprising the step of applying in connection with the carrier, machine readable indicia representative of the type medical item.

18. The method according to claim 5 wherein step (a) comprises placing a transparent cover in overlying relation of the medical items, wherein the medical items are visible through the cover.

19. The method according to claim 18 wherein step (a) includes moving the cover in a channel extending in the carrier.

20. The method according to claim 5 wherein step (a) comprises extending a projecting portion in operative connection with a holder for a medical item, through an aperture in connection with the carrier, and securing the projection in the aperture with securing means.

* * * * *

UNITED STATES PATENT AND TRADEMARK OFFICE
CERTIFICATE OF CORRECTION

PATENT NO : 6,141,942

DATED : November 7, 2000

INVENTOR(S) : David T. Frederick

It is certified that error appears in the above-identified patent and that said Letters Patent are hereby corrected as shown below:

Column 8, line 36, "between turn" is changed to --between turns--.

Signed and Sealed this

Eighth Day of May, 2001

*Attest:*

NICHOLAS P. GODICI

*Attesting Officer*

*Acting Director of the United States Patent and Trademark Office*